United States Patent
Mederer

(10) Patent No.: US 6,690,095 B2
(45) Date of Patent: *Feb. 10, 2004

(54) DEVICE FOR SUPPLYING CURRENT AND/OR VOLTAGE TO A VEHICLE TRAILER FOR THE SUPPLY OF BRAKE COMPONENTS

(75) Inventor: Martin Mederer, Munich (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/301,669

(22) Filed: Nov. 22, 2002

(65) Prior Publication Data

US 2003/0071519 A1 Apr. 17, 2003

Related U.S. Application Data

(63) Continuation of application No. 09/343,706, filed on Jun. 30, 1999.

(51) Int. Cl.$^7$ ................................................. B60L 1/00
(52) U.S. Cl. ........................ 307/9.1; 307/64; 307/10.1
(58) Field of Search ............................... 307/9.1, 10.1, 307/64; 340/693.2, 333, 431, 507, 509; 303/89, DIG. 1

(56) References Cited

U.S. PATENT DOCUMENTS

| | | |
|---|---|---|
| 3,913,064 A | 10/1975 | Salway et al. |
| 3,920,045 A * | 11/1975 | Horowitz et al. ......... 137/627.5 |
| 3,929,381 A * | 12/1975 | Durling .................... 303/118.1 |
| 3,967,863 A | 7/1976 | Tomecek et al. |
| 4,295,053 A | 10/1981 | Kovatch et al. |
| 4,345,663 A * | 8/1982 | Shields ........................ 180/177 |
| 4,589,704 A * | 5/1986 | Graham ..................... 303/9.76 |
| 4,793,661 A | 12/1988 | Munro |
| 5,277,485 A * | 1/1994 | Broome .................... 303/119.1 |
| 5,389,823 A | 2/1995 | Hopkins et al. |
| 5,549,362 A | 8/1996 | Broome |
| 5,649,749 A * | 7/1997 | Kullmann et al. ...... 303/122.04 |
| 5,929,532 A | 7/1999 | Sell |
| 5,949,147 A | 9/1999 | McGrath et al. |
| 6,075,439 A | 6/2000 | Woerner et al. |
| 6,515,376 B1 * | 2/2003 | Mederer .................... 307/10.1 |

FOREIGN PATENT DOCUMENTS

| | | |
|---|---|---|
| DE | 4129203 | 3/1993 |
| DE | 19608970 | 9/1997 |
| EP | 530460 B1 | 3/1993 |
| WO | WO 00/53477 | 9/2000 |

OTHER PUBLICATIONS

"Graubremse," Issue 2, 1986, pp. 1–9.

"Grau, ABS–Systeme," 1990, pp. 14–21.

Elektrische Verbindungen zwischen Zug—und Anhängefahrzeugen mit elektrischer 24 V–Ausrüstung—Typ 24N (normal), DIN ISO 1185, Dec., 1983.

(List continued on next page.)

Primary Examiner—Brian Sircus
Assistant Examiner—Sharon A. Polk
(74) Attorney, Agent, or Firm—Barnes & Thornburg

(57) ABSTRACT

A device for supplying current and/or voltage to a vehicle trailer for the electric supply of brake components of the vehicle trailer, where the vehicle trailer is connected with the tractor vehicle by a first supply line. At least one second supply line is provided to connect the vehicle trailer with the tractor vehicle. A brake light supply line may be used as the second supply line providing the current and/or voltage supply line for the electronic and/or electric components of a braking device of a vehicle trailer when the supply of the braking device has failed.

6 Claims, 1 Drawing Sheet

OTHER PUBLICATIONS

Steckvorrichtung fürautomatische Blockierverhinderer, DIN ISO 7638, Oct. 1987.

Commercial road vehicles—Electrical connections between towing and towed vehicles,—Interchange of digital information, Parts 1, 2 and 3, 1996.

Federal Register, vol. 61, No. 32, Feb. 15, 1996, Department of Transportation, National Highway Traffic Safety Administration, Federal Motor Vehicle Safety Standards; Stability and Control of Medium and Heavy Vehicles During Braking, pp. 5949–5955.

Federal Register, vol. 61, No. 106, May 31, 1996, Department of Transportation, National Highway Traffic Safety Administration, Federal Motor Vehicle Safety Standards; Air Brake Systems, pp. 27288–27304.

* cited by examiner

DEVICE FOR SUPPLYING CURRENT AND/OR VOLTAGE TO A VEHICLE TRAILER FOR THE SUPPLY OF BRAKE COMPONENTS

This is a continuation of U.S. patent application Ser. No. 09/343,706, filed Jun. 30, 1999.

BACKGROUND AND SUMMARY OF THE INVENTION

The invention relates to a device for supplying current and/or voltage to a vehicle trailer for the supply of brake components of the vehicle trailer, in the case of which the vehicle trailer is connected with the tractor vehicle by a first supply line, and to a corresponding use.

In the case of brake systems for utility vehicles, and particularly in the case of brake systems for vehicle trailers and semitrailers, normally the function of braking the vehicle trailer or semitrailer is carried out by an electronic brake system. For reasons of safety, normally dual-line brake systems are used, in which the above-mentioned lines are normally provided for compressed air or a liquid. By means of the electronic brake system, the mechanical or pneumatic components required for the braking are controlled and/or automatically controlled as a function of the various parameters, as, for example, the loading of the trailer or the intensity of the operation of the brake pedal by the operating person. Particularly in the case of trailers, antilock systems are used more and more frequently which require a corresponding control or automatic control.

For the current and/or voltage supply of the electric or electronic components, which are connected with the braking device of the trailer or of the semitrailer, normally a supply line is used which extends from the tractor vehicle by way of a plug to the vehicle trailer.

From German Patent Document DE 196 08 970 A1, it is known to provide the current or voltage supply in the case of a vehicle trailer or vehicle semitrailer by a brake light line and an indicator line. This device of the above-mentioned type for supplying current or voltage is further developed such that a low current continuously flows on the brake light line so that this current can provide the supply of electric consuming devices. However, the above-mentioned current supply has the disadvantage that the consuming devices, which require the electric supply and which are arranged in the trailer, are no longer supplied with electric energy if the connection between the tractor vehicle and the trailer is interrupted or the supply fails for other reasons; that is, that, for example, in the event of the supply of the electric components, the electronic braking systems also fails. Thus, for example, when the electronic braking system also has an antilock system, this antilock system can no longer be used for the braking if the supply line fails. But conventional known emergency or auxiliary braking devices must be used which also have the known disadvantages, specifically the disadvantage that no controlled braking of the trailer is possible and particularly a locking of the wheels in the case of this so-called backup case is very probable.

It is an object of the present invention to further develop a device for supplying current and/or voltage to a vehicle trailer for supplying brake components of the vehicle trailer such that the electric braking system is permitted to operate in a normal brake operating mode as well as in a backup mode and/or if the supply line fails.

According to the invention, a device for supplying current and/or voltage to a vehicle trailer as the supply of brake components of the vehicle trailer, in the case of which the vehicle trailer is connected with the tractor vehicle by a first supply line, further includes at least a second supply line connects the vehicle trailer with the tractor vehicle. By this solution according to the invention, it is possible for the electronic braking system of the trailer to provide in the normal operation a supply by way, for example, ISO (International Organization for standardization) No.7638 and/or ISO 11992. For this purpose, for example, according to the ISO 7638, for the supply of current and/or voltage, the contacts 2 and 3 of the plug-type connection are used between the tractor vehicle and the trailer vehicle. In the event of a failure of this voltage supply variant, the electronic braking system of the trailer is supplied by way of another line. This other line can be provided by the seizure of contact numbers according to the ISO 7638 by the same plug but also be by seizing other contact number or preferably by another plug-type connection, as, for example, one according to ISO 1185. Since, by this supply variant, a sufficient amount of current or voltage can be made available, also in a backup mode, all consuming devices, which require a corresponding supply, can continue to be sufficiently supplied. In addition, when a correspondingly fast switch-over is provided to the second supply line, it is also possible to reach the legally required response and threshold times. In particular after 0.4 seconds after a sudden change of pressure at the trailer braking valve, the braking cylinder situated the farthest away must be acted upon by 90% of the sudden change of pressure. Particularly by the second supply line, the electronic control unit, the pressure gauge sensors, the controlling of a backup valve and the controlling of the respective side of one of two antilock system valves respectively is permitted. In which case, it may be sufficient for implementing the "holding or bleeding" function to control one respectively of two on-off valves.

In the event of a failure of the first supply line, the current and/or voltage supply is preferably permitted by the at least one second supply line.

If preferably the brake light supply line is the second supply line, it is ensured that a sufficient current and/or voltage supply is permitted. The second supply line is preferably the supply line of the right or left tail light. As the result of these two above-mentioned preferred measures, it is possible to permit a secure handling of the electronic braking system with additional cable expenditures which are as low as possible.

The second supply line preferably is a supply line of a free plug-type connection of the socket and plug arrangement on the vehicle and/or on the vehicle trailer.

If a detection device is preferably provided, detects which the failure of the first supply line, a fast switch-over to the second supply line is possible. A switching device is preferably provided which switches the current and/or voltage supply from the second supply line to the supply line of the brake components.

The above-mentioned device is preferably used for supplying current and/or voltage to a vehicle trailer and particularly to the consuming devices connected with the brake components.

According to the invention, a brake light supply line is used as the current and/or voltage supply line for supplying the electronic and/or electric components of the braking device of a vehicle trailer when the supply of the braking device has failed. As the result of this measure according to the invention, it is possible, in the event of a failure of the actual braking device supply line, to still sufficiently supply the consuming devices of the electronic braking system with current and/or voltage.

The invention will be described in the following without limiting the general idea of the invention by means of embodiments with reference to the drawings on the basis of examples, to which reference is explicitly made with respect to the disclosure of all details according to the invention not explained in detail in the text.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
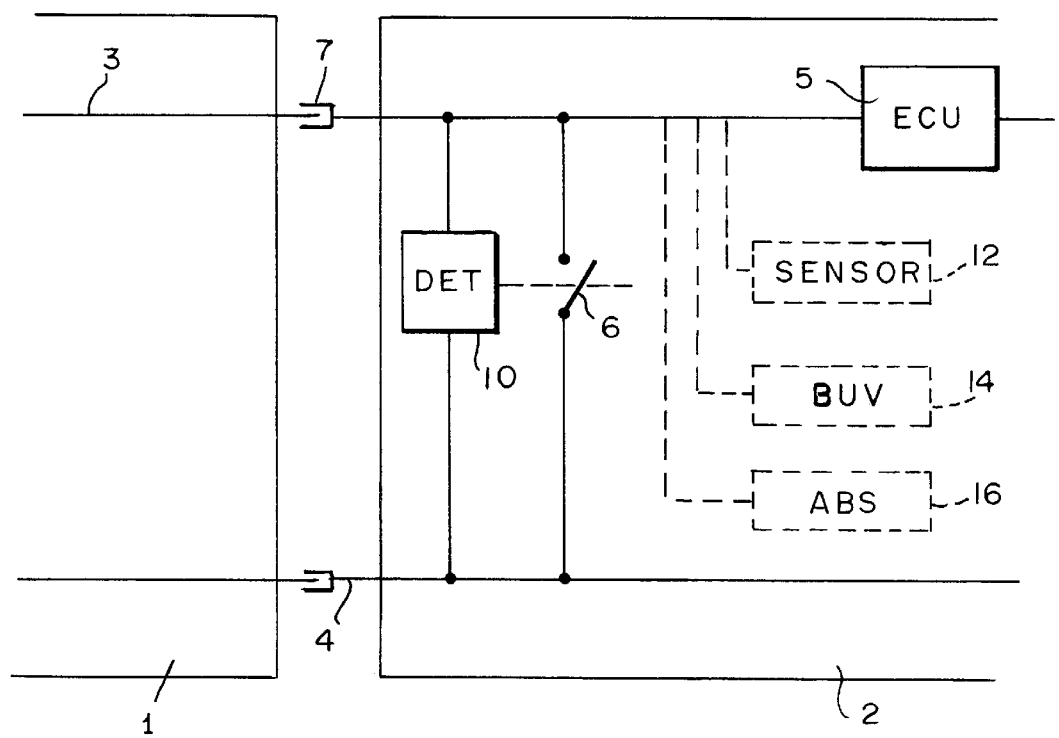
FIG. 1 is a schematic representation of an embodiment according to the invention.

FIG. 1 illustrates an embodiment according to the invention of a device for supplying current and/or voltage to a vehicle trailer for supplying brake components of the vehicle trailer. The left part of FIG. 1 schematically shows the tractor vehicle 1. The trailer 2 is schematically illustrated on the right side. By way of a supply line 3, current and/or voltage is provided to the electronic control unit 5 by a plug-type connection 7. In the event of a failure of this supply line detected by detection device 10, whether as the result of a cable breakage of the supply line 3 itself or as the result of a fault of the plug-type connection 7, the supply of the electronic control unit 5 is permitted by way of the brake light supply line 4 and a switching-over of the switch 6, which may, for example, be a relay, by the detection device 10. Within the scope of this invention, the term "vehicle trailer" includes "vehicle semitrailers."

In particular, an embodiment can also be selected in which the second supply line is connected not by way of a region of the supply line 3 to the electronic components of the braking system of the trailer, as particularly the electronic control unit 5, but at least partially directly to the respective components or consuming devices. The braking system may include one or more of electronic control unit 5 or pressure gauge sensors 12 or back-up valve 14 or anti-lock system valves 16.

What is claimed is:

1. A device for supplying current and/or voltage to a vehicle trailer as the supply of brake components of a braking system of the vehicle trailer, comprising:

a first supply line connecting the braking system of the vehicle trailer with a tractor vehicle;

brake light supply line connecting the vehicle trailer with the tractor vehicle; and means for automatically connecting the brake light supply line with the braking system of vehicle trailer in the event of a failure of the connected first supply line.

2. A device according to claim 1, wherein the brake light supply line is a supply line which is arranged on the vehicle and/or vehicle trailer by free plug-type connections in a socket and plug arrangement.

3. A device according to claim 1, including a detection device which detects the failure of the first supply line.

4. A device according to claim 1, wherein the means includes a switching device which switches the current and/or voltage supply from the second supply line to the supply line of the braking system.

5. A device according to claim 1, wherein the braking system includes at least two or more of electronic control unit, pressure gauge sensors, back-up valve, anti-lock system valves.

6. A method of supplying current and/or voltage to a vehicle trailer as a supply of an electronic and/or electric components of a braking system of the vehicle trailer from a tractor vehicle, wherein a first supply line connects the tractor to the trailer's electronic and/or electric components of the braking system and a brake light supply line connects the tractor to the trailer, the method comprising: automatically using the brake light supply line as the current and/or voltage supply line for supplying the electronic and/or electric components of the braking system of the vehicle trailer when the supply from the connected first supply line has failed.

* * * * *